US009248607B2

(12) United States Patent
Schulze et al.

(10) Patent No.: US 9,248,607 B2
(45) Date of Patent: Feb. 2, 2016

(54) METHOD FOR CONNECTING FIBER-REINFORCED INTERMEDIATE PRODUCTS FOR PRODUCING A STRUCTURAL FIBER COMPOSITE PRODUCT, SUCH A STRUCTURAL FIBER COMPOSITE PRODUCT AND A METHOD AND DEVICE FOR PRODUCING AN ADHESIVE LAYER

(71) Applicant: Airbus Operations GmbH, Hamburg (DE)

(72) Inventors: Wolfgang Schulze, Hasloh (DE); Thomas Kruse, Hermannsburg (DE)

(73) Assignee: Airbus Operations GmbH, Hamburg (DE)

( * ) Notice: Subject to any disclaimer, the term of this patent is extended or adjusted under 35 U.S.C. 154(b) by 284 days.

(21) Appl. No.: 13/648,063

(22) Filed: Oct. 9, 2012

(65) Prior Publication Data
US 2013/0288036 A1 Oct. 31, 2013

Related U.S. Application Data

(60) Provisional application No. 61/543,883, filed on Oct. 6, 2011.

(30) Foreign Application Priority Data

Oct. 6, 2011 (DE) .......................... 10 2011 115 406

(51) Int. Cl.
*B29C 65/00* (2006.01)
*B29C 65/56* (2006.01)
(Continued)

(52) U.S. Cl.
CPC ............ *B29C 65/564* (2013.01); *B29C 65/483* (2013.01); *B29C 65/488* (2013.01);
(Continued)

(58) Field of Classification Search
CPC B29C 65/488; B29C 65/5057; B29C 65/564; B29C 65/487; B29C 65/5014; B29C 65/34; B29C 64/344; B29C 66/0246; B29C 37/0082; B29C 66/022; B29C 66/30321; C09J 5/06
USPC ...................... 156/91, 92, 306.6, 306.9, 273.9
See application file for complete search history.

(56) References Cited

U.S. PATENT DOCUMENTS 3,431,157 A * 3/1969 Mack .................. B29C 37/0082
156/182
4,015,035 A * 3/1977 Blad .................. B29C 37/0082
156/158
(Continued)

FOREIGN PATENT DOCUMENTS

DE 69820273 T2 10/2004
DE 60320277 T2 7/2009
(Continued)

*Primary Examiner* — John Goff
(74) *Attorney, Agent, or Firm* — Jenkins, Wilson, Taylor & Hunt, P.A.

(57) ABSTRACT

Method for connecting two intermediate products for forming a fiber composite product, wherein the two intermediate products respectively are composite fiber material with a layer of matrix material and reinforcing fibers extending therein by connecting areas that adjoin one another in an overlapping region of the interconnected intermediate products, with the method including applying an adhesive layer with an adhesive film with connecting particles onto the connecting areas of the intermediate products, arranging the second intermediate product on the first intermediate product or vice versa so the connecting areas at least partially overlap one another, and connecting the two intermediate products. A structural component is also disclosed with at least a first and a second fiber-reinforced intermediate product.

8 Claims, 6 Drawing Sheets

(51) Int. Cl.
  *B29C 65/50* (2006.01)
  *B29C 70/84* (2006.01)
  *B29C 65/72* (2006.01)
  *C09J 5/06* (2006.01)
  *B64C 1/00* (2006.01)
  *B29C 65/48* (2006.01)

(52) U.S. Cl.
  CPC ......... *B29C65/5057* (2013.01); *B29C 65/5092* (2013.01); *B29C 65/72* (2013.01); *B29C 66/0246* (2013.01); *B29C 66/1122* (2013.01); *B29C 66/43* (2013.01); *B29C 66/721* (2013.01); *B29C 66/72141* (2013.01); *B29C 70/84* (2013.01); *B64C 1/00* (2013.01); *C09J 5/06* (2013.01); *B29C 65/4835* (2013.01); *B29C 65/4885* (2013.01); *B29C 66/02245* (2013.01); *B29C 66/71* (2013.01); *B29C 66/7212* (2013.01); *B29C 66/73921* (2013.01); *B29C 66/73941* (2013.01); *B29C 66/83421* (2013.01); *Y02T 50/433* (2013.01); *Y10T 156/17* (2015.01); *Y10T 428/249923* (2015.04)

(56) References Cited

U.S. PATENT DOCUMENTS

| | | | | |
|---|---|---|---|---|
| 4,528,051 | A | * | 7/1985 | Heinze et al. .................... 156/92 |
| 4,888,228 | A | * | 12/1989 | Sidles .............................. 428/86 |
| 6,146,576 | A | * | 11/2000 | Blackmore .................... 264/404 |
| 6,517,658 | B1 | | 2/2003 | Wageman et al. |
| 2005/0186390 | A1 | | 8/2005 | Bersuch et al. |
| 2008/0274326 | A1 | * | 11/2008 | Kim et al. ....................... 428/90 |

FOREIGN PATENT DOCUMENTS

| | | |
|---|---|---|
| DE | 10 2008 008200 A1 | 8/2009 |
| DE | 10 2009 047671 A1 | 6/2011 |
| WO | WO 2011/069899 | 8/2011 |

\* cited by examiner

METHOD FOR CONNECTING FIBER-REINFORCED INTERMEDIATE PRODUCTS FOR PRODUCING A STRUCTURAL FIBER COMPOSITE PRODUCT, SUCH A STRUCTURAL FIBER COMPOSITE PRODUCT AND A METHOD AND DEVICE FOR PRODUCING AN ADHESIVE LAYER This application claims the benefit of the filing date of German Patent Application No. DE 10 2011 115 406.3, filed on Oct. 6, 2011, and of U.S. Provisional Patent Application No. U.S. 61/543,883, filed on Oct. 6, 2011, the entire disclosures of which are incorporated herein by reference.

The invention concerns a method for connecting fiber-reinforced intermediate products for producing a structural fiber composite product, such a structural fiber composite product, a method and a device for producing an adhesive layer for using in the method for connecting fiber-reinforced intermediate products.

The invention particularly pertains to a method for connecting two intermediate products that respectively consist of a composite fiber material with a layer of matrix material and reinforcing fibers extending therein, and to a structural component that consists of at least a first and a second fiber-reinforced intermediate product. The invention furthermore pertains to a method for producing an adhesive layer for connecting intermediate products, as well as to a device for producing an adhesive layer.

In modern aircraft construction, individual components and, in particular, fuselage components of an aircraft are assembled of parts and predominantly constructed in sections. For example, a plurality of prefabricated barrel-like fuselage segments with a skin in the form of a fuselage segment shell is joined in order to form the complete aircraft fuselage cell. For their reinforcement, each fuselage segment features several transverse frames or annular frames that are arranged behind one another in the longitudinal direction of the fuselage segment and extend in the circumferential direction, as well as longitudinal reinforcing elements in the form of longitudinal frames that extend along the longitudinal direction of the fuselage segment and consist, in particular, of so-called "stringers" or stringer profiles. A circumferential fuselage segment skin assembled, e.g., of skin segments is mounted on the transverse frames and the longitudinal frames. In addition, the transverse frames are mounted, in particular, on the longitudinal frames. In order to connect the individual fuselage sections to one another, the skins and/or longitudinal frames of different fuselage segments can be mounted on one another and therefore connected to one another.

The individual parts or intermediate products such as skin segments, transverse frames and longitudinal frames are mounted on one another at the respective connecting points by means of rivets and assembled into an aircraft fuselage. If the components used consist of composite fiber materials, they are also connected to one another by means of bonding.

It is the objective of the invention to make available a structural fiber composite product and a method for connecting fiber-reinforced intermediate products for producing such a structural fiber composite product, which structural fiber composite product can be composed of at least two fiber-reinforced parts and has in its connecting area it's a high load-bearing capacity and fatigue strength while the connection of the intermediate products can be performed in an efficient manner. Another objective of the invention is to make available a method for connecting fiber-reinforced intermediate products into a structural component, the connecting regions of which, at which the intermediate products are connected to one another, can be inspected in a nondestructive fashion.

Another objective of the invention is to make available a method and a device for producing an adhesive layer with connecting particles, by means of which a connection between intermediate products can be produced in order to form a structural component.

These objectives are attained with the characteristics of the respective independent claims. Other embodiments are disclosed in the claims that respectively refer to these independent claims.

The inventive solutions make it possible, in particular, to produce connections between structural components or product parts thereof from intermediate products that are made of or consist of a composite fiber material. One of the product parts can in particular be a support member and the other product part can be a fuselage cell skin for producing a fuselage of an aircraft or a space craft. The support member can be a longitudinal support member or a stringer or a tranversal support member. Further, one of the product parts can in particular be a support member and the other product part can be a further support member.

The connection of the intermediate products can be performed in a time-efficient and cost-efficient manner. The connecting regions, at which the structural components or intermediate products thereof adjoin one another and are connected to one another, have a high quality and therefore a high dependability, i.e., a high reliability of the structural component to be produced can be achieved. A special embodiment of the invention also allows the nondestructive inspection of the connecting regions such that the connecting regions between structural components or intermediate products thereof can be inspected while or after these connections are produced and even qualified with a verified test procedure. The inventive solutions make it possible, in particular, to produce structural components of aircraft by means of bonded connections between structurally relevant intermediate products of a composite fiber material, wherein these bonded connections can be inspected in a nondestructive fashion, in particular, for the certification by regulatory aviation authorities.

Another advantage of the inventive solutions therefore can be seen, in particular, in that possible defects in the material or in bonded connections can be detected with relatively little effort. Particularly in overlapping connections as they are typically produced by means of bonding, so-called peeling stresses on the facing upper sides or surfaces of the different interconnected connecting sections of different intermediate products or structural components are avoided in overlapping connecting sections of different interconnected intermediate products or structural components. Due to the inventive solutions, forces acting upon the connecting sections perpendicular to the bonded surfaces do not lead to damages of the surfaces of the connecting sections because the entire effective connecting region between the connecting sections can be used for the force transmission.

In the implementation of the inventive solutions and the realization of the related structural connections, it is not necessary to utilize any so-called safety rivets for connecting the respective connecting sections due to the quality of the connections and due to the ability to inspect the connections. However, such safety rivets may be additionally utilized. In a bonded connection between two structural components such as a "stringer" and a skin, for example, it would be possible to connect the connecting sections to be connected to one another by means of bonding, as well as riveting. In this case, the respective rivets can absorb peeling stresses, particularly on the end region of reinforced components, and furthermore make it possible to realize a damage-tolerant behavior of a bonded connection. In this case, particularly the riveted connections can be easily checked for cracks by means of ultrasound or a UV light.

According to an embodiment of the invention, it is also possible to inspect a structural component that features riveted connections between intermediate products consisting of composite fiber materials and additional bonded connections in this region with respect to its integrity in a nondestructive fashion. When drilling rivet holes in a fiber-reinforced component, fibers are severed such that the direction of the principal load or the principal load-carrying axis is weakened. Due to the bonded connection produced in accordance with the invention, it is therefore prevented that a thusly weakened component can tear along the fiber direction of the component beginning at the rivet hole and consequently fail, particularly also in a load scenario.

In the realization of the inventive solutions, however, it is not necessary to provide drilling points for accommodating rivets such that the problem of providing a quasi-isotropic layered structure at the unnecessary drilling points is eliminated. The inventive solutions therefore make it possible to achieve a significant reduction of the production effort and of the costs per component. Furthermore, rivets that can be avoided in accordance with the invention, namely even light metal rivets, increase the weight of the aircraft such that less weight can be transported or more fuel is required, respectively.

According to a first aspect of the invention, a method for connecting at least two intermediate products that consist of a composite fiber material with a layer of matrix material and reinforcing fibers extending therein is proposed, wherein the first intermediate product features a first connecting section and the second intermediate product features a second connecting section that adjoin one another in an overlapping region of the intermediate products to be connected to one another, with the method featuring the following steps:

applying an adhesive layer that features an adhesive film of a material that can be plastically deformed in a first state and cured in a second state, as well as a plurality of elongate connecting particles that are accommodated by the adhesive film, onto the first connecting section of the first intermediate product or the second connecting section of the second intermediate product in such a way that at least a portion of the plurality of connecting particles sectionally comes in contact with reinforcing fibers of the first connecting section or the second connecting section, wherein the adhesive film is in the first, plastically deformable state during the application of the adhesive layer, arranging the second intermediate product on the first intermediate product or vice versa in such a way that the connecting section of the second intermediate product at least partially overlaps the connecting section of the first intermediate product, connecting the two intermediate products by exerting pressure upon the adhesive layer and/or by generating heat in the adhesive layer.

In this way, at least one intermediate product generally can be connected to another intermediate product at their connecting regions. It would consequently also be possible to connect two or more than two intermediate products to another intermediate product at connecting sections.

In this way, a double-sided connection of connecting sections is achieved, wherein particularly the risk of an adhesive failure in the connecting region or at the connecting sections under a load is relatively low. Consequently, there is only a slight risk of a boundary layer separation between the respective connecting section of the component and the adhesive film in this connecting region or at the connecting sections under a load.

With respect to the application of the adhesive layer, it would be possible, in particular, that this adhesive layer features an adhesive film of a material that can be plastically deformed in a first state and cured in a second state, as well as a plurality of connecting particles, particularly carbon connecting particles. In mechanical, adhesive and positive respects, the adhesive film preferably has properties similar to those of the matrix material of at least one intermediate product. In other words, the adhesive film is able to embed itself into the sectionally exposed connecting sections as long as their matrix material is in a plastic state and at least equivalently replaces the missing matrix within an intermediate product. Among other things, one property of carbon connecting particles is their electric conductivity along their tubes. The insulating adhesive layer therefore is transformed into a conductive layer by means of the carbon connecting particles.

It is also advantageous if the connecting particles respectively penetrate the adhesive film and protrude from the adhesive film with two end sections that lie opposite of one another referred to the principal longitudinal direction of the connecting particles. This enables at least a portion of the plurality of connecting particles to contact reinforcing fibers of the first connecting section and the second connecting section with their respective end sections. In order to realize the attainable inventive effects, i.e., the increase in the strength of the connection between intermediate products and/or the electric conductivity, it is proposed, in particular, that the portion of the plurality of connecting particles that is in contact with reinforcing fibers of the first connecting section and the second connecting section amounts to 0.1 volume percent or 0.3 volume percent of the respective overall adhesive layer situated between the intermediate products.

Due to the structural material properties of the fiber-reinforced intermediate product and the carbon connecting particles, so-called van der Waals forces may be generated between the intermediate product and the carbon connecting particles. These forces are attractive forces of uncharged and/or polarized molecules that lead to a weak attraction of these molecules. This requires that the molecules come sufficiently close to one another for initiating an electrostatic interaction. Particularly in the inventive method, this occurs between connecting particles and reinforcing fibers of the respective fiber-reinforced intermediate product.

When the second intermediate product is arranged on the first intermediate product, the connecting sections of both intermediate products preferably overlap in their entirety such that the surface areas of the intermediate products or the sectionally exposed reinforcing fibers in the surface areas completely cover one another, i.e., their sectionally exposed connecting sections lie directly on top of one another referred to the thickness direction of the connecting sections. The advantage of such an embodiment can be seen in that the number of contact points within the connection between the intermediate products is as high as possible. Consequently, numerous connecting particles can interact with the sectionally exposed reinforcing fibers in the surface areas in order to produce rigid bonds.

In order to additionally increase the probability of producing numerous bonds between the connecting particles and the reinforcing fibers of the intermediate products to be connected, it is proposed to arrange an adhesive layer with connecting particles between the connecting sections of the two intermediate products. Consequently, the molecular bonds and therefore the van der Waals bonds increase in the same proportion such that the adhesive force between intermediate sections that holds together two intermediate products also increases. It is also possible to arrange several adhesive layers with connecting particles on only one intermediate product.

A thusly realized connection with connecting particles acts similar to a Velcro fastener or a very fine denticulation. The finer the denticulation or the Velcro fastener, the larger the contacting surface in the connecting section. The forces to be absorbed and transmitted consequently are distributed over the plurality of connections or over the carbon connecting particles, respectively. This means that each carbon nanotube needs to transmit a lower force such that each individual carbon nanotube is relieved and the overall bond therefore is strengthened.

In the inventive method, it would be possible, in particular, that the matrix material of the first intermediate product or of the second intermediate product or of the first and the second intermediate product respectively is or are in a cured and/or plastic state. In this respect, it would also be possible that only or at least the connecting section of the respective intermediate product is in a cured and/or plastic state.

The reinforcing fibers of the intermediate products generally may consist, in particular, of carbon fibers (CFRP), ceramic fibers, glass fibers (GFRP), aramid fibers (AFRP), boron fibers (BFRP), steel fibers, basalt fibers, natural fibers or nylon fibers. According to the invention, it is proposed to use conventional materials, particularly a resin, as matrix material.

According to an embodiment of the inventive method, it is proposed, in particular, that at least a portion of the connecting particles has a tubular shape or pin shape that extends in a principal longitudinal direction, wherein the maximum diameter of cross-sectional areas, to which the principal longitudinal direction respectively extends perpendicular, amounts to up to 1.000 nm and the length of the connecting particles amounts to 0.5 mm to 5 mm. Materials that contain carbon and, in particular, electrically conductive carbon or even metallic materials such as, in particular, materials containing nickel may be used as material for the connecting particles.

In this context, the principal longitudinal direction may, in particular, be the direction of the longest straight line extending through the respective connecting particle or two points of surface areas that lie opposite of one another. In this context, under the expression "length" herein the distance between the two points of surface areas that lie in the principal longitudinal direction opposite of one another is understood. Further, in this context, the expression "overall maximum diameter" means the maximum diameter of the maximum diameters of cross-sectional areas, to which the principal longitudinal direction respectively extends perpendicular.

According to an embodiment of the inventive method, it is proposed, in particular, that an adhesive layer with a thickness direction extending transverse to the planar extent thereof is applied in an embodiment, in which at least a portion of the connecting particles is situated within the adhesive film and/or in which at least a portion of the connecting particles penetrates the adhesive film in such a way that these connecting particles extend along the thickness direction of the adhesive layer and at least one of two end sections that lie opposite of one another referred to the principal longitudinal direction of the connecting particles protrudes from one of the oppositely arranged surfaces of the adhesive film.

According to an embodiment of the inventive method, it is proposed, in particular, that the respective matrix material of at least the connecting section of one of the intermediate products is initially in a cured state, and that reinforcing fibers are in this case sectionally exposed in order to make available a respective connecting section such that at least a portion of the plurality of connecting particles comes in contact with reinforcing fibers of the first connecting section or the second connecting section when applying the adhesive layer with the adhesive film and the plurality of elongate connecting particles contained in the adhesive film.

The exposing of reinforcing fibers may be realized in such a way that only a section of the reinforcing fibers is exposed on the surface of the residual layer of the connecting section that remains after the removal of matrix material. In this case, it is not necessary to expose the entire cross section of the reinforcing fibers, but it rather suffices to merely expose a lateral surface of the reinforcing fibers, i.e., not their entire circumference or cross section. On the other hand, it would also be possible that several layers of reinforcing fibers are exposed in the connecting section such that the matrix material merely extends up to a greater depth of the reinforcing fiber layers.

It would also be possible, in particular, that at least the connecting sections of all intermediate products consist of a matrix material in a cured state, and that reinforcing fibers are in this case sectionally exposed in the respective connecting sections in order to respectively make available a connecting section.

According to the invention, it would be possible to remove matrix material in the respective connecting section until reinforcing fibers are sectionally exposed in order to realize the sectional exposure of reinforcing fibers in a surface area of the first and/or second connecting section of the respective intermediate product, wherein the removal of matrix material is realized by exposing the surface of the first and/or second connecting section of the respective intermediate product to the radiation of a laser.

According to an embodiment of the inventive method, it is proposed, in particular, that the respective matrix material of at least the connecting section of one of the intermediate products is initially in a plastic or free-flowing state such that at least a portion of the plurality of connecting particles comes in contact with reinforcing fibers of the first connecting section or the second connecting section when the adhesive layer with the adhesive film and the plurality of elongate connecting particles contained in the adhesive film is applied.

In this case, it would be possible, in particular, that the intermediate product, the matrix material of which is in a plastic state, consists of a ductile prepreg material.

In the inventive methods, it would therefore be possible, in particular, that the matrix material of the connecting section of one of the intermediate products is in a cured state and reinforcing fibers are in this case sectionally exposed in order to make available a respective connecting section, and that the matrix material of the connecting section of the respective other intermediate product is initially in a plastic or free-flowing state. In this case, an adhesive layer generally is applied onto the respective connecting section by placing and/or pressing the adhesive layer onto the respective connecting section, preferably by initially placing and/or pressing the adhesive layer onto a connecting section of a first intermediate product and subsequently placing and/or pressing the connecting section of a second intermediate product onto the adhesive layer on the connecting section of the first intermediate product.

The pressing of an adhesive layer onto and, due to the liquid or free-flowing or plastic state of the matrix material of the respective connecting section of an intermediate product and the adhesive layer, into the connecting section is realized in such a way that a majority and, in particular, the predominant portion of the connecting particles contained in the respective adhesive layer come in contact with reinforcing fibers of the respective connecting section of an intermediate product. A connecting section of the respective other intermediate product is then placed onto the adhesive layer. The intermediate product may be realized in such a way that reinforcing fibers are exposed thereon due to a corresponding removal of matrix material or that the matrix material is in a liquid or free-flowing or plastic state in a surface area of the first and/or second connecting section of the respective intermediate product. In both instances, the connecting particles contained in the adhesive layer come in contact with the reinforcing fibers of the connecting section of the second intermediate product when the respective connecting section is placed on or placed and pressed on accordingly. This is realized, in particular, due to the van der Waals forces that act between the respective connecting particle and on the one hand the reinforcing fiber of one intermediate product and on the other hand the reinforcing fiber of the other intermediate product, in the immediate vicinity of which sections of the connecting particles are respectively situated when the connecting sections adjoin one another.

With respect to the application of the adhesive layer, it would be possible, in particular, that the adhesive layer features an adhesive film of a material that can be plastically deformed in a first state and cured and a second state and a plurality of connecting particles, particularly carbon connecting particles. In mechanical, adhesive and positive respects, the adhesive film ideally has properties similar to those of the matrix material of at least one intermediate product. In other words, the adhesive film is able to embed itself into the sectionally exposed connecting sections and at least equivalently replaces the missing matrix, within an intermediate product. Among other things, one property of carbon connecting particles is their electric conductivity along their tubes. The insulating adhesive layer therefore is transformed into a conductive layer by means of the carbon connecting particles.

It is also advantageous if the connecting particles respectively penetrate the adhesive film and protrude from the adhesive film with two end sections that lie opposite of one another referred to the principal longitudinal direction of the connecting particles. This enables the respective end sections of at least a portion of the plurality of connecting particles to come in contact with reinforcing fibers of the first connecting section and/or the second connecting section. In this way, it is ensured that the carbon connecting particles produce bonds, particularly molecular bonds, with the fibers and/or the matrix.

In another variation that may be realized alternatively or additionally to one of the described embodiments, it would be possible that the matrix material of the connecting layer of an intermediate product and/or the matrix material of the connecting layer of the respective second intermediate product is made of a duroplastic material. This is possible in both instances, i.e., for an intermediate product with a connecting section, in which reinforcing fibers are exposed or need to be exposed, as well as for an intermediate product with a connecting section of a second intermediate product to be applied, the matrix material of which is in a plastic or viscous state. In this case, it would be possible that the plastic or viscous matrix material is initially cured and subsequently heated and transformed into a plastic or viscous state before the adhesive layer is applied. In this state, the connecting particles of the adhesive layer can be inserted or pressed into the plastic or viscous matrix material in such a way that they are connected to or come in contact with reinforcing fibers when the adhesive layer is pressed on. This method can be advantageously applied if no matrix material was removed from the connecting section, onto which the adhesive layer is applied, such that the reinforcing fibers are situated in the matrix material. In this way, the step of removing matrix material can be eliminated.

According to an embodiment of the inventive method, it would be possible, in particular, that the following step precedes the application of the adhesive layer onto the respective connecting section of the first and/or the second intermediate product: removing connecting particles from a substrate layer, on which a plurality of connecting particles is made available, by means of the adhesive film in a plastic state and absorbing connecting particles by sectionally pressing the adhesive film onto the substrate layer featuring the connecting particles, particularly by flatly pressing a section of the adhesive layer that is made available at a distance from the substrate layer onto the substrate layer by means of a roller in such a way that the connecting particles at least partially penetrate the adhesive film and are separated from the substrate.

An important aspect of the invention can be seen in realizing a connection between two fiber-reinforced intermediate products in a measurable fashion. According to an embodiment of the inventive method, it is proposed, in particular, that the connecting particles and the reinforcing fibers consist of an electrically conductive material, and that electric connecting devices for connecting electrically conductive measuring lines to a contacting device for realizing the electric contacting thereof are connected to surfaces of the respective connecting section of each of the intermediate products that in their cured state face away from the surfaces of the respective connecting section, to which the adhesive layer is applied, wherein the connecting devices are respectively realized in such a way that each connecting device features an electrically conductive connecting element that is in electric contact with at least one reinforcing fiber on the one hand and electrically connected to the respective contacting device on the other hand.

In this embodiment of the inventive method, the reinforcing fibers of the intermediate products are electrically conductive fibers and may consist or be made, in particular, of carbon fibers (CFRP) or metallic fibers.

In this embodiment of the inventive method, an electrically conductive material is furthermore utilized as material for the connecting particles. Materials that contain carbon or even metallic materials such as, in particular, materials containing nickel may be accordingly utilized for the connecting particles. The connecting particles may consist, in particular, of carbon nanotubes.

Consequently, the integrity of the reinforcing fibers and therefore the bond between the interconnected fiber-reinforced intermediate products can be easily, quickly and reliably determined with the aid of an electrical measurement and therefore measuring variables such as current, voltage or resistance. At a constant voltage, for example, cavities within an intermediate product can be identified in the form of a change in the resistance and/or the amperage relative to a material that does not contain a cavity. Such a measuring method therefore merely requires a current and resistance measuring device, the electrodes of which are in contact with the measuring points on a bonded connection.

Similar to a matrix material of the intermediate products, the adhesive layer in this case consists of plastic materials such as thermosetting plastics (also referred to as thermosetting polymers or synthetic resins) and/or elastomers and/or thermoplastics.

Although the matrix material of the intermediate products and the base or substrate layer of the adhesive layer therefore consist of materials, particularly plastic materials, that have a particularly high insulating power, two intermediate products consisting of a composite fiber material with a layer of matrix material and reinforcing fibers extending therein are, according to the invention, connected to one another, wherein the inventive solution makes it possible to carry out electrical measurements in order to check the integrity of the connections between two respectively overlapping connecting sections such that a check and measurement of a material-adapted connection between fiber-reinforced intermediate products or components can be carried out on the following structure: fiber-reinforced intermediate product or component, adhesive layer, fiber-reinforced intermediate product or component.

In case the matrix material of the second intermediate product is in a plastic state, it preferably consists of a ductile prepreg material. In such a pre-impregnated material, the fibers or scrims are already provided with matrix material. Consequently, the labor-intensive step of laying fibers or forming scrims can be eliminated and it is merely required to transform the easily deformable prepreg material into the desired shape and to subsequently cure the prepreg material.

It is furthermore advantageous if reinforcing fibers are sectionally exposed in a surface area of the first intermediate product in order to make available a first connecting section. This preferably also applies to a surface area of the second intermediate product, i.e., its reinforcing fibers may also be sectionally exposed in order to make available a second connecting section, particularly if its matrix material is in a cured state.

In other words, the inventive method is a cobonding or secondary bonding method, in which an adhesive layer is arranged on a connecting section of a first intermediate product and a second intermediate product is applied onto the first intermediate product with its connecting section. Material-adapted connections between fiber-reinforced products can be produced by means of so-called cobonding or secondary bonding. In cobonding, a cured intermediate product is connected to a non-cured intermediate product while two cured intermediate products are connected to one another in secondary bonding. At least in secondary bonding, an adhesive layer is applied onto a connecting section in order to non-positively connect both intermediate products to one another.

The sectional exposing of reinforcing fibers in a surface area of the first and/or second connecting section of the respective intermediate product is preferably realized by removing matrix material in the respective connecting section until reinforcing fibers are sectionally exposed. In this case, the removal of matrix material may be realized by exposing the surface of the first and/or connecting section of the respective intermediate product to the radiation of a laser.

It can therefore be ensured that the matrix material can be removed with observation of strict quality requirements. In this respect, a laser is particularly suitable for already dry, cured fiber-reinforced intermediate products. For example, the wavelength of the laser can be exactly adapted to the matrix material such that only this matrix material is evaporated from the bond without damaging the fibers.

The following step preferably precedes the step of applying the adhesive layer onto the respective connecting section of the first and/or the second intermediate product: removing connecting particles, particularly carbon connecting particles, form a substrate, on which the connecting particles are produced. This is preferably realized by deflecting a plastic adhesive film by means of a deflection roller that presses the adhesive film onto the connecting particles in the contact line between roller and connecting particles. In this case, the pressure is chosen such that the connecting particles preferably at least partially penetrate the adhesive film and are separated from the substrate. The pressure is furthermore chosen such that the connecting particles with the greatest possible length are separated. In this way, the probability of contacting the fibers of an intermediate product can be increased. The at least partial penetration of the adhesive film also makes it possible to ensure that the two end sections that lie opposite of one another referred to the principal longitudinal direction of the connecting particles come in contact with reinforcing fibers of the first connecting section and/or the second connecting section. Particularly stable bonds between two intermediate products can be produced in this way because it is consequently possible that one nanotube respectively connects one fiber of an intermediate product. The force acting upon an intermediate product therefore can be optimally transmitted to another intermediate product beyond the connecting section by means of the molecular bonds.

The carbon connecting particles ideally have an orientation in the at least one adhesive layer that lies in an angular range of 0 to +/−45 degrees referred to a normal vector of a surface plane of an intermediate product.

The substrate, on which the carbon connecting particles are arranged, may consist, for example, of a silicon substrate, on which zones of carbon connecting particles are synthesized by means of chemical vapor deposition.

In the last step that was initially mentioned and results in a rigid pond, the two intermediate products are preferably connected by exerting pressure upon the adhesive layer and/or by generating heat in the adhesive layer. This may be realized, for example, with the aid of an autoclave.

In order to easily check or measure a connecting section between two intermediate products, it is preferred to provide electric connecting devices on surfaces of the respective connecting sections of each of the intermediate products that in their cured state face away from the surfaces of the respective connecting section, onto which the adhesive layer is applied. In a concrete embodiment, these electric connecting devices may consist of metal layers, e.g., of copper that are applied by means of chemical vapor deposition.

In order to connect electrically conductive measuring lines, these connecting devices may be connected to a contacting device for realizing the electric contacting thereof. Concretely, this may mean that contacting devices in the form of the anode and the cathode of a voltage source or a measuring device can be connected to the metal layers that consist, for example, of copper.

The connecting devices may be respectively realized in such a way that each connecting device features an electrically conductive connecting element that is in contact with at least one reinforcing fiber on the one hand and electrically connected to the respective contacting device on the other hand.

A connection between two fiber-reinforced intermediate products, particularly of carbon fibers, can be easily, quickly and reliably checked with the aid of such an embodiment.

Due to the electrically conductive properties of carbon fibers and the now electrically conductive connecting section, the connection can be inspected by means of measuring variables such as, e.g., current, voltage or resistance. At a constant voltage, for example, cavities within a connection between two intermediate products can be identified in the form of a change in the resistance and/or the amperage. Such a measuring method therefore merely requires a voltage source and a current and resistance measuring device, the electrodes of which are in contact with the connecting devices.

According to another aspect of the invention, a structural component or structural product is proposed that comprises at least a first and a second fiber-reinforced intermediate product
  that are connected to one another in a connecting region and
  that consist of a composite fiber material with reinforcing fibers extending in a matrix material, wherein the connecting region between the at least two fiber-reinforced intermediate products features: at least one adhesive layer that features an adhesive film and a plurality of connecting particles, particularly carbon connecting particles, distributed therein,
At least a portion of the plurality of connecting particles is in contact with the reinforcing fibers on the surface of the matrix material of at least one intermediate product. Further, connecting particles of at least a portion of the plurality of connecting particles protrude into at least one fiber-reinforced intermediate product and contacts at least one reinforcing fiber.

According to an embodiment a structural fiber composite product comprising at least a first and a second fiber-reinforced product part,
  wherein the product parts are connected to one another in a connecting region with a connecting section lying therebetween and
  wherein each of the product parts comprise a composite fiber material with load-bearing reinforcing fibers extending in a matrix material thereof, wherein the connecting section between the at least two fiber-reinforced intermediate products is made of resin and comprises a plurality of connecting particles being made of carbon and being distributed therein,
  wherein the connecting particles of at least a portion of the plurality of connecting particles protrude from the connecting section and protrude into at least one fiber-reinforced intermediate product and wherein a plurality of reinforcing fibers are contacted by the connecting particles of the portion of connecting particles providing a load-bearing path between the connecting particles and the load-bearing reinforcing fibers.

According to an embodiment of the inventive structural component, it is proposed that the connecting particles and the reinforcing fibers consist of an electrically conductive material, and that electric connecting devices for connecting electrically conductive measuring lines to a contacting device for realizing the electric contacting thereof are connected to surfaces of the respective connecting section of each of the intermediate products that in their cured state face away from the surfaces of the respective connecting section, onto which the adhesive layer is applied, wherein the connecting devices are respectively realized in such a way that each connecting device features an electrically conductive connecting element that is in electric contact with at least one reinforcing fiber on the one hand and electrically connected to the respective contacting device on the other hand.

According to the invention, the inventive structural component features: at least one first and one second fiber-reinforced intermediate product that are connected to one another in a connecting region and consist of a composite fiber material with reinforcing fibers that extend in a matrix material, wherein the connecting region lies between the at least two fiber-reinforced intermediate products.

In a connecting region, the structural component or the component assembly is preferably provided with at least one adhesive layer that features an adhesive film and a plurality of connecting particles, particularly carbon connecting particles, distributed therein. In this case, at least a portion of the plurality of connecting particles is in contact with the reinforcing fibers on the surface of the matrix material of at least one intermediate product.

It is furthermore advantageous if at least a portion of the plurality of connecting particles protrudes into at least one fiber-reinforced intermediate product and contacts at least one reinforcing fiber. In this context, protruding into means that the carbon connecting particles penetrate the outermost boundary layer of an intermediate product or the protective matrix cover, respectively, and therefore are able to directly contact the fibers of a fiber-reinforced intermediate product. The closest and tightest arrangement of carbon connecting particles possible on the fibers respectively provides the advantages that were already described above with reference to the method and makes it possible to maximize the van der Waals forces.

With respect to the advantages of carbon connecting particles in an adhesive layer, we refer to the embodiments of the inventive method that also apply without limitation in this case.

In the inventive method, the principal longitudinal directions of numerous connecting particles and, in particular, at least 15% of the connecting pieces situated in a connecting section preferably have an orientation in the at least one adhesive layer that lies in an angular range between 0 and +/−45 degrees referred to the normal vector of a surface plane of an intermediate product that occurs at the location of the respective connecting particle.

According to another aspect of the invention, a method for producing an adhesive layer for connecting intermediate products or components is proposed. In this case, it is preferred that each intermediate product or component respectively consists of a composite fiber material with a layer of matrix material and reinforcing fibers extending therein.

The method advantageously features the following steps: inserting a plurality of connecting particles into an adhesive film in such a way that the connecting particles respectively penetrate the adhesive film and protrude from the adhesive film with at least one of two end sections that are situated opposite of one another referred to the principal longitudinal direction of the connecting particles. The penetration of the adhesive film has the advantage that the respective end sections of a portion of the plurality of connecting particles come in contact with reinforcing fibers of the first connecting section and/or the second connecting section. This ensures that the carbon connecting particles produce molecular bonds with the fibers and/or the matrix.

In an advantageous enhancement, the adhesive film consists of a material that can be plastically deformed in a first state and cured in a second state. Consequently, the plastically deformable adhesive film can be easily arranged on an intermediate product similar to a prepreg material or a fiber scrim and subsequently cured under the influence of pressure and/or heat.

The inserting of the connecting particles into the adhesive film is preferably realized by pressing the adhesive film onto the plurality of connecting particles of a semifinished connecting particle product, namely by rolling a roller over the adhesive film. This rolling process may be carried out while a predetermined pressure is exerted, wherein the roller is preferably rolled on a surface of the adhesive film. This roller advantageously faces away from the side of the adhesive film that faces the semifinished connecting particle product. The semifinished connecting particle product ideally is a substrate, on which carbon connecting particles are arranged. The substrate may consist of silicone, on which zones of carbon connecting particles are produced by means of chemical vapor deposition.

In order to avoid repetitions, we refer to the explanations of above-described methods that also apply without limitations in this case.

In order to produce an above-described adhesive layer, a production device is required that preferably features the following characteristics: a receptacle device for accommodating a semifinished product, particularly in the form of a semifinished connecting particle product with a base layer and a plurality of connecting particles that protrude from the base layer. In this case, the semifinished connecting particle product preferably is a substrate, on which carbon connecting particles are arranged. The base layer may consist of silicone, on which zones of carbon connecting particles that essentially protrude perpendicular to the base layer are produced by means of chemical vapor deposition.

The production device may furthermore feature: a rolling device with a tool frame and a roller that is rotatably supported thereon. The rolling device is preferably realized similar to a paint roller for applying wall paints, i.e., it consists of a rotatable roller in a frame or a tool frame, by means of which the roller can be guided. The surface of such a rolling device or such a roller is ideally adapted to the properties of the adhesive layer. This means that an adhesive layer cannot adhere to the surface of the roller.

Since the adhesive layer has properties similar to those of the matrix of the intermediate products to be connected, it is advantageous to realize the rolling device such that it can be heated and/or cooled. However, a plastic that is identical to the matrix material of an intermediate product may also serve for realizing the adhesion. Suitable heating elements consist, e.g., of heating coils in the rolling device while a Peltier element makes it possible to heat and to cool the rolling device. Such an element consists of an electrothermal transducer that operates based on the Peltier effect and generates a temperature difference relative to the ambient temperature when a current flows through the element.

In order to guarantee a reproducible quality of an adhesive layer of a connecting section, the rolling device is preferably realized in a spring-loaded fashion in order to exert a predetermined contact pressure during the absorption of the carbon connecting particles. Consequently, it is ensured that a plurality of carbon connecting particles has a spatial orientation that allows an electric measurement or in which their end sections lie opposite of one another referred to the principal longitudinal direction of the connecting particles and therefore protrude from an adhesive film with at least one end section.

It is furthermore advantageous if the production device features: a holding device for holding a strip-shaped semifinished product, particularly in the form of an adhesive tape, such that the strip-shaped semifinished product can be held between a semifinished product positioned on the receptacle device and the roller. In an advantageous embodiment, the adhesive layer is realized in the form of a strip-shaped adhesive tape, in which connecting particles, particularly carbon connecting particles, are arranged as described above with reference to the method.

It is also advantageous if the production device features: motion kinematics, by means of which the tool frame can be moved along the receptacle device in such a way that the roller of the rolling device can be rolled on the semifinished product positioned on the receptacle device while it exerts a predetermined pressure. The predetermined pressure is adjusted in such a way that the carbon connecting particles can ideally be arranged perpendicular on a connecting section of an intermediate product or component.

A rolling device may, in principle, also be realized in an automated fashion, for example, in the form of a robot and/or driving devices such as a roller drive. In this case, the driving device may be controlled with respect to its speed and/or power. This not only lowers the costs, but also ensures a reproducible quality of the adhesive layer on an intermediate product.

The following explanations apply to the described inventive methods, as well as to the inventive structural component or component assembly. In the present instance, an intermediate product or component refers, in particular, to a fuselage cell skin, a stringer and/or frame and, in particular, an annular frame. However, preliminary stages of a stringer or an annular frame are also subsumed under this term. An intermediate product may also consist, for example, of an individual fiber, a woven fabric or a scrim of fibers in impregnated or dry form.

With respect to the connection between two intermediate products or components, it is respectively advantageous to adapt the length of the carbon connecting particles to the thickness or the height of the adhesive layer. This supports the correct orientation of the carbon connecting particles such that they can fulfill their function as an electric bridge between the intermediate products. This also ensures that the carbon connecting particles do not lose the desired orientation when a connection is produced under the influence of pressure and/or heat.

The invention is described in greater detail below with reference to the exemplary embodiments illustrated in the figures. In these schematic figures.

Figure 9:
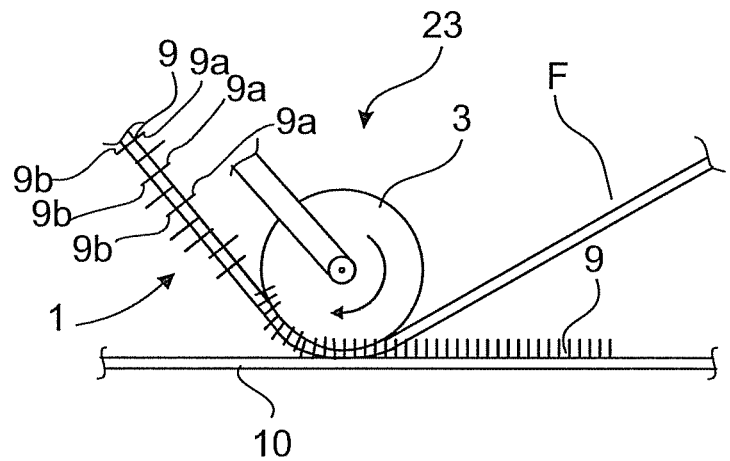
Figure 10:
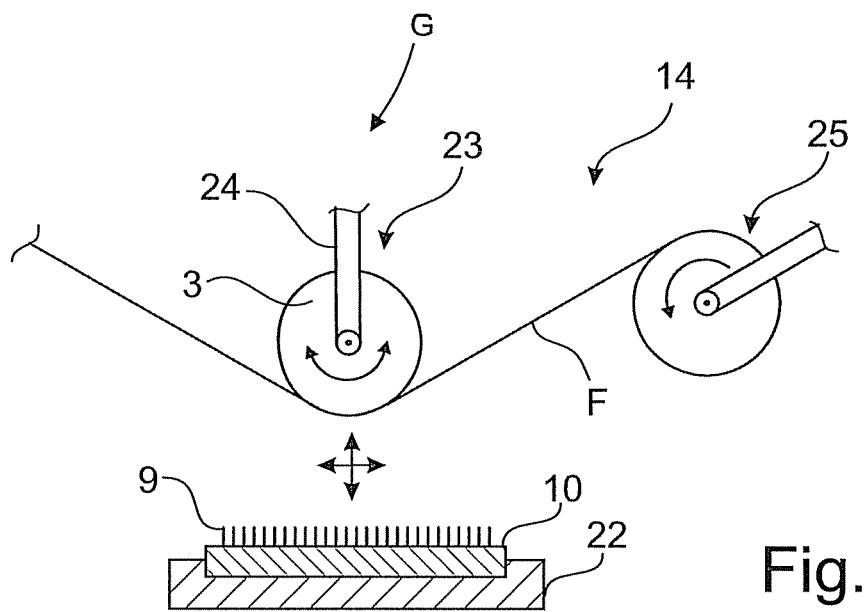

FIG. 9 shows a production device for producing an adhesive layer with a receptacle device for accommodating a semifinished product, particularly in the form of a substrate that contains connecting particles, and with a rolling device for pressing the semifinished product onto the substrate, wherein the production device is illustrated in a production step for producing an adhesive layer; and FIG. 10 shows the production device for producing an adhesive layer according to FIG. 9 in a state, in which the adhesive layer is held at a distance from the substrate.

A structural fiber composite product P according to the invention comprises at least a first fiber-reinforced product part 111a and a at least a second fiber-reinforced product part 111b. The first fiber-reinforced product part 111a and the second fiber-reinforced product part 111b are connected to one another by a connecting region 108 with a connecting section 109 lying therebetween. Each of the product parts 111a, 111b are made of a composite fiber material comprise a matrix material which can in particular be made or consist of a resin and load-bearing reinforcing fibers 12 extending in the matrix material. The connecting section 109 is realized by an adhesive layer 1 being disposed between a first and a second intermediate product 11a, 11b by which the first fiber-reinforced product part 111a and the second fiber-reinforced product part 111b, respectively, are formed during manufacturing of the structural fiber composite product P.

Each of the product parts 111a, 111b preferably comprises a composite fiber thermosetting material with load-bearing reinforcing fibers 12 extending in a matrix material or moulded thermosetting material thereof, wherein the connecting section 109 between the at least two fiber-reinforced intermediate products 11a, 11b is made of resin and comprises a plurality of connecting particles 9 being made of carbon and being distributed therein. The connecting particles 9 of at least a portion of the plurality of connecting particles 9 protrude from the connecting section 109 and protrude into at least one fiber-reinforced intermediate product 11a, 11b and wherein a plurality of contacts at least one reinforcing fibers 12 are contacted by the connecting particles 9 of the portion of connecting particles 9 providing a load-bearing path between the connecting particles 9 and the load-bearing reinforcing fibers 12.

The two fiber-reinforced intermediate products 11a, 11b are made of a duroplast or a thermoset or curable plastics which in particular comprises free-flowing thermosetting moulding compounds are granular plastics that cross-link in a chemical reaction when heated. Finished moulded parts are produced using injection moulding or press processing. The moulding compounds can be based on: phenolic resin, melamine-/melamine-phenol resin, urea resin, unsaturated polyester resin, epoxy resin, silicone resin, diallylphthalate or diallylisophthalate, resin. In particular, the raw material of the moulding compound consists of or comprises:

- binders for providing cross-linking and strength with 20 to 50 weight %, wherein the binders can comprise the moulding compound,
- load-bearing fibers for providing cross-linking and strength with 1 to 60 weight % and preferably 20 to 60 weight %,
- optionally fillers for providing cross-linking and strength with 20 to 40 weight %,
- optionally additives for providing cross-linking and strength with 1 to 5 weight %,
- optionally colouring agents/pigments for providing cross-linking and strength with 1 to 2 weight %.

The adhesive layer 1 is made or consists of a resin. Therefore, also the connecting section 109 is made or consists of a resin. Preferably the same type of resin is used for the adhesive layer 1 and the connecting section 109, respectively, as the type of resin on which the duroplast or thermoset is based.

The effect is that the first fiber-reinforced product part 111a and a second fiber-reinforced product part 111b are connected to each other not only by the connecting force resulting from the connection of the materials of the connecting section 109 and the first fiber-reinforced product part 111a and a second fiber-reinforced product part 111b, respectively, but also by the connection between the reinforcing fibers 12 and the connecting particles 9. Thereby, the advantages of the connection between the matrix material or moulding compound of the connecting section 109 and the matrix material or moulding compound of the first fiber-reinforced product part 111a and the second fiber-reinforced product part 111b, respectively, are combined with the advantages of additional connections between the connecting particles 9 and the load-bearing reinforcing fibers 12, each of which consist of carbon or are made of carbon. The additional connections between the connecting particles 9 and the load-bearing reinforcing fibers 12 are realized by binding forces resulting from van-der-Waals-forces which can be considered as being created by elementary particles.

Referring to FIGS. 1 to 6 an embodiment of the method for connecting two intermediate products or components 11a, 11b is described that respectively is made or consists of composite fiber material with a layer of matrix material and reinforcing fibers extending therein. In this case, a first intermediate product 11a is made of or consists of a cured composite fiber material and a second intermediate product 11b is made of or consists of a composite fiber material, the matrix material of which is in a cured or plastic state. In this context the expression "cured state" means that the matrix material of the respective intermediate product is in a cured state and cannot be deformed, and the expression "plastic state" means that the matrix material of the respective intermediate product is in a plastic or flowable or pasty or semi-liquid state in which the respective intermediate product is viscous and can be deformed.

Generally, before connecting the two intermediate products the first intermediate product 11a and also the second intermediate product 11b are in a cured state. Alternatively, before connecting the two intermediate products the first intermediate product 11a is in a cured state and the second intermediate product 11b is in a plastic state or, vice versa, the first intermediate product 11a is in a plastic state and second intermediate product 11b is in a cured state. Also, before connecting the two intermediate products both intermediate products 11a, 11b can be in a plastic state.

According to a preferred embodiment of the invention, the matrix material of the both intermediate products 11a, 11b is made of a thermoset or thermosetting plastics or duroplastic material and is a free-flowing thermosetting moulding compound. In an alternative embodiment of the invention, the matrix material of the both intermediate products 11a, 11b is a thermoplastic material.

Reinforcing fibers may be sectionally exposed in a surface area of the first intermediate product 11a in order to make available a first connecting section 18a, wherein reinforcing fibers may also be sectionally exposed in a surface area of the second intermediate product 11b if the matrix material thereof is in a cured state in order to make available a second connecting area 18b.

Figure 1:
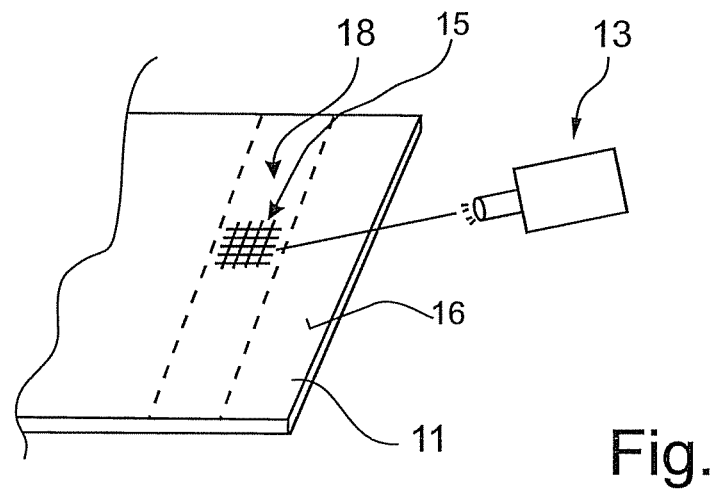
FIG. 1 shows the process step of removing a matrix from an intermediate product.

FIG. 1 shows the first step of the method, namely the sectional removal of matrix material or moulding compound in a surface area of a connecting area 18 of the respective intermediate product 11. The connecting area 18 can be the connecting area 18a or 18b and the intermediate product 11 can be the intermediate product 11a or the intermediate product 11b. the removal of the matrix material is performed such that the reinforcing fibers or sections thereof are exposed to the outer surface 12 of the respective intermediate product 11. This can be realized by respectively exposing the surface of the connecting area 18, 18a, 18b of the intermediate products 11, 11a, 11b or the matrix material to the radiation of a laser 13. Alternatively, the removal of matrix material or moulding compound can e.g. be performed by milling. By the removal a recess 15, 15a, 15b in the intermediate product 11, 11a, 11b is realized.

In this embodiment of the inventive method, the matrix material or moulding compound of the connecting region 18 is produced of the cured, dried intermediate product 11, wherein the reinforcing fibers are exposed in this connecting region such that fibers of the intermediate product can directly contact connecting particles 9 of an adhesive layer 1 yet to be applied. In a later step, electrically conductive connecting particles are used, in particular, if they form the prerequisite for an electrical measurement process.

When the matrix of the fiber-reinforced composite material is removed from the intermediate product 11, 11a, 11b by means of a laser 13, the wavelength of the laser 13 is adjusted to the matrix material such that only this matrix material evaporates from the composite and the fibers remain undamaged.

In a further step, an adhesive layer is interposed between the connecting areas of the intermediate products so that the van der Waals bonds between the intermediate product 11 and the connecting particles 9 when the adhesive layer with these connecting particles is applied onto the intermediate section. Consequently, the contact surface of the intermediate product is increased such that greater forces can be transmitted. In other words, the surface of a positive connection is enlarged such that stress peaks are avoided. The strength of such a connection therefore is also increased.

Another advantage of such a preparation can be seen in that the probability of van der Waals bonds on the fibers is on the one hand relatively high and the contact surface of the intermediate product for the adhesive layer 1 to be applied is on the other hand increased. This effect is similar to the principle of a fine denticulation or a Velcro fastener. The finer the denticulation or the Velcro fastener, the higher the adhesive forces between adjoining surfaces in the connecting area. Consequently, the forces to be absorbed and transmitted are distributed over a plurality of connections or carbon connecting particles, respectively. In this way, each connecting particle only needs to transmit a relatively low force such that each individual connecting particle is relieved and the overall bond therefore is strengthened. This means that correspondingly higher forces are transmitted with a larger contact surface of the adhesive layer. In other words, the surface of a positive connection is enlarged such that stress peaks can be avoided. Consequently, a thusly realized connecting area significantly increases the strength of the connection.

Figure 2A:
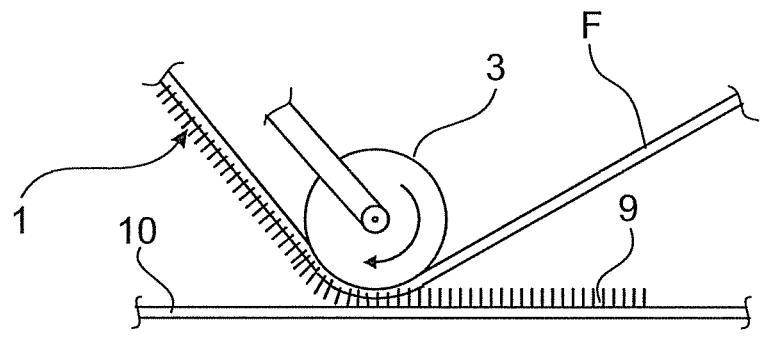
FIGS. 2a and 2b show the process step of applying carbon connecting particles onto an adhesive layer by means of a rolling device.
Figure 2B:
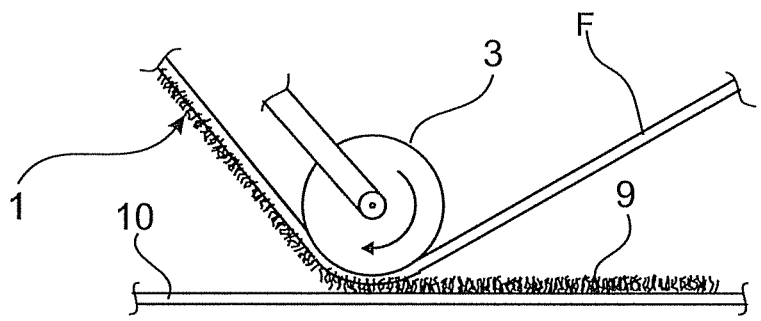

The procedural step according to FIGS. 2a and 2b is carried out simultaneously with, subsequent to or even prior to the above-described step. Carbon connecting particles 9 are removed from a substrate 10, on which the growth of the connecting particles 9 took place. The connecting particles 9 can be provided in a regular manner in the form of a forest (FIG. 2a) or in an irregular manner (FIG. 2b). This is realized by deflecting a plastic adhesive film F with the aid of a deflection roller 3 that presses the adhesive film F. onto the connecting particles 9 in the contact line between the roller 3 and the connecting particles 9. The pressure is adjusted in such a way that the connecting particles 9 at least partially penetrate the adhesive film F and are removed from the substrate 10 after the plastic adhesive film F was rolled on the substrate 10 and thereby an adhesive layer 1 is produced. The 1 has a form which matches with the form of the recess 15, 15a, 15b. E.g. the width of the respective recess 15, 15a, 15b is provided such that the adhesive layer 1 fills the respective recess at least with regard to the width.

The principal longitudinal directions of the connecting particles 9 according to FIG. 2a along the contact line preferably are aligned approximately perpendicular to the surface of the roller 3. This makes it possible to once again apply the connecting particles 9 approximately perpendicular to the surface of the intermediate product 11 together with the respective adhesive film F, the produced the adhesive layer 1 during its application onto an intermediate product 11.

Figure 3:
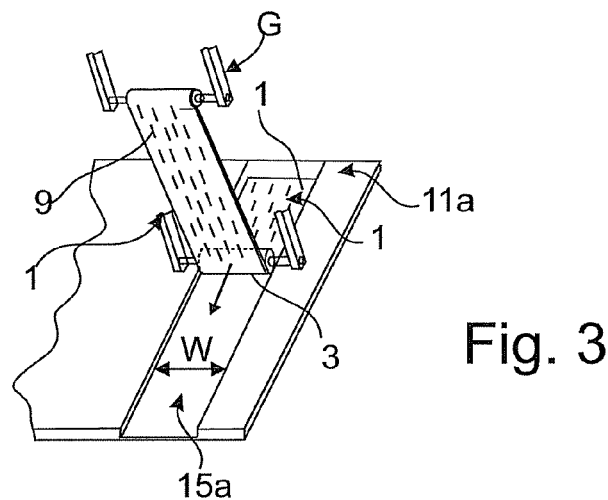
FIG. 3 shows the process step of applying the adhesive layer with carbon connecting particles onto an intermediate product.

FIG. 3 shows a further step of the application of an adhesive layer 1. In this case, an adhesive film 2 with connecting particles 9 is applied onto the connecting area 18a of the first intermediate product 11a by a guiding device G. The adhesive film 2 is in a plastically deformable state in this case. The connecting particles 9 penetrate the adhesive film 2 and protrude from the adhesive film 2 with two end sections that lie opposite of one another referred to the principal longitudinal direction of the connecting particles in an embodiment of the adhesive film (see FIG. 2). Consequently, at least a portion of the plurality of connecting particles 9 is able to contact reinforcing fibers of the connecting area 11a with their respective end sections. FIG. 3 furthermore shows an option of applying the adhesive layer 1, namely by means of a roller 3. This roller deflects the adhesive film 2 with the connecting particles 9 that are jointly supplied from above in such a way that the adhesive layer 1 is ultimately applied onto the surface of the intermediate product 11a. The adhesive layer 1 is simultaneously pressed onto the connecting area 18a of the intermediate product 11a with a certain pressure. Alternatively, the adhesive layer 1 may also be manually applied. In comparison with a manual application, the advantage of the application by means of the roller 3 can be seen in the reproducible quality of the application of the adhesive layer onto an intermediate product.

It is possible that the carbon connecting particles 9 are not only applied onto the material together with the adhesive film F, but also incorporated into the material. This is possible because the matrix was sectionally removed from the surface areas of the intermediate product 11.

Figure 8:
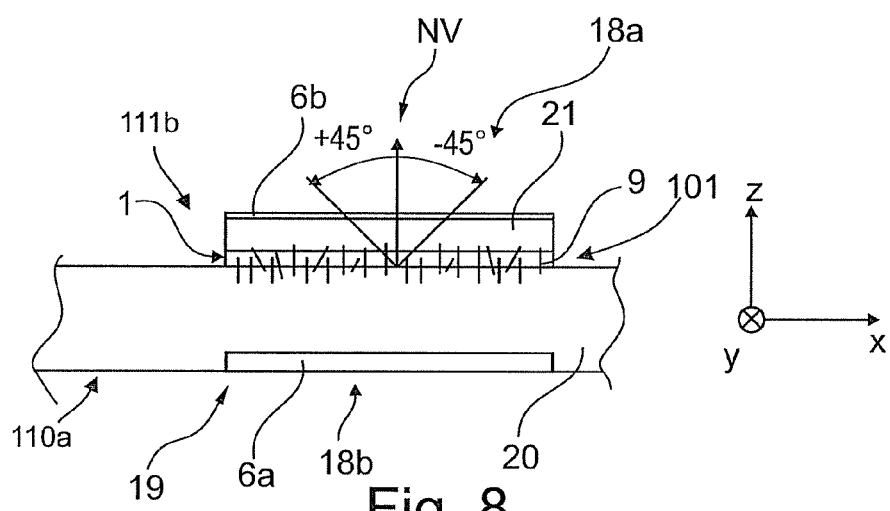
FIG. 8 shows a sectional representation of an embodiment of the inventive structural component.

FIG. 8 shows the preferred angular range of the carbon connecting particles 9 applied onto an intermediate product. In order to respectively achieve an adequate mechanical force transmission, as well as an adequate electric conductivity of the adhesive layer 1 on or in/on an intermediate product 11, the invention proposes to arrange a certain portion of the carbon connecting particles 9 on the surface of the intermediate product 11 within an angular range of +/−45 degrees. This angular range of +/−45 degrees refers to a normal vector NV that extends perpendicular to the surface of the adhesive layer 1. Furthermore, this angular range is not limited to the x-z plane indicated in FIG. 8 only, but also applies to the y-z plane. Consequently, FIG. 8 shows that the connecting particles 9 are arranged on the surface of the intermediate product 11 within a fictitious 45 degree cone around the normal vector NV. This is elucidated in FIG. 8, wherein only connecting particles 9 in the x-z plane and in the surface boundary layer are illustrated in this figure. Other orientations outside this preferred angular range may also occur, but are not suitable for realizing the electric conductivity between two connecting areas of a connecting region in a particularly advantageous fashion although they still promote the mechanical strength of the connection between two connecting areas of a connecting region (due to adhesive forces and cohesive forces).

Figure 4A:
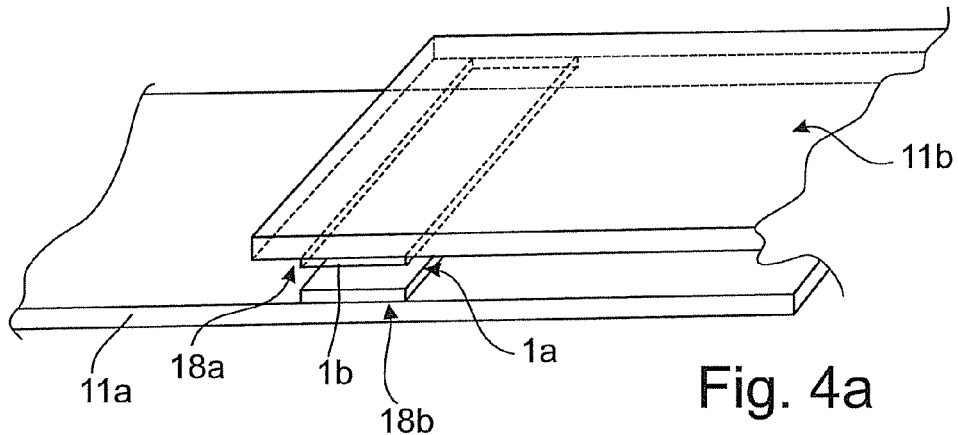
FIGS. 4a and 4b shows a section through different embodiments f a combination of intermediate products after the application of the adhesive layer with carbon connecting particles.

FIG. 4a shows the procedural step of arranging the second intermediate product 11b on the first intermediate product 11a in such a way that the connecting area 18b of the second intermediate product 11b at least partially overlaps the connecting area 18a of the first intermediate product 11a. The connecting areas 18a and 18b both have flat surfaces because no matrix material was removed from the respective intermediate product 11a, 11b. The intermediate product 11a, 11b are not yet brought in contact to each other. Both of the adhesive layers 1 shown feature connecting particles 9. The intermediate products 11a and 11b are illustrated at a distance from one another in order to better elucidate this fact. The spatial arrangement of the adhesive layer 1 on the first intermediate product 11a, as well as the respective spatial arrangement of the second intermediate product 11b on the adhesive layer 1 or the intermediate product 11a, is realized in such a way that the connecting areas 18a, 18b of the intermediate products 11a and 11b respectively overlap one another referred to the planar extent thereof.

Figure 4B:
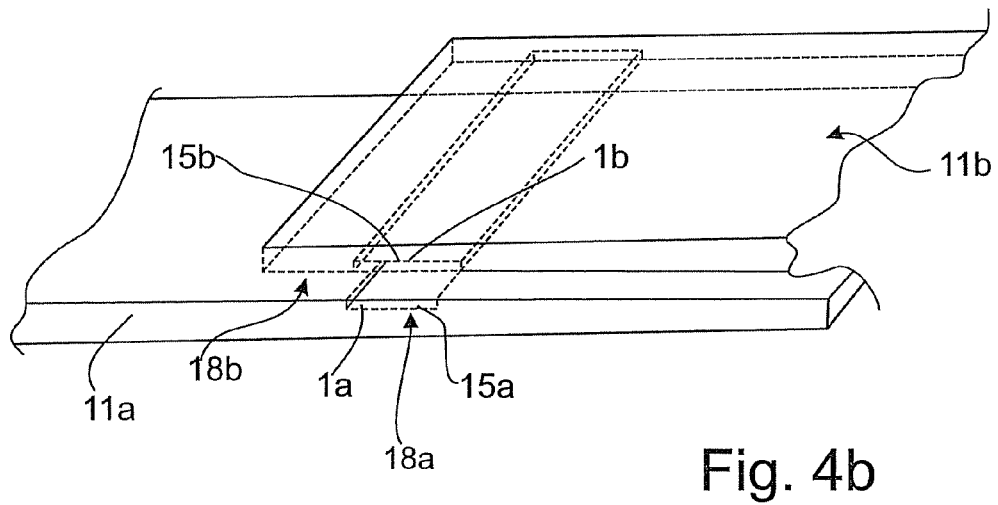

FIG. 4b shows the same state as FIG. 4a, however, the connecting areas 18a and 18b both a recess 15a, 15b, respectively, is formed by removal of matrix material.

In such an arrangement, van der Waals forces occur when the connecting areas 18a, 18b of the respective intermediate products 11a and 11b approach one another and cause the connecting particles to develop the tendency to align themselves in such a way that they contact reinforcing fibers of the different connecting areas 18a, 18b in the overlapping regions of two adhesive layers 1. In the inventive method, this is realized for a significant portion of the connecting particles of an adhesive layer. A thusly produced connection acts similar to a Velcro fastener or a very fine denticulation between connecting particles and reinforcing fibers. The finer the denticulation or the Velcro fastener, the larger the interactive surface in the connecting area 18 and the higher the forces that can be absorbed and transmitted.

FIGS. 5a, 5b, 5c and 5d show enlarged views of different embodiments of connecting areas 18a, 18b and connections between the intermediate products 11a, 11b. Different layers 12 of reinforcing and load-bearing fibers are shown in the figures. As an example reference numerals 12a, 12b, 12c name a respective single layer of reinforcing and load-bearing fibers. Only one of the connecting particles 9 shown is named by the reference numeral "9".

Figure 5A:
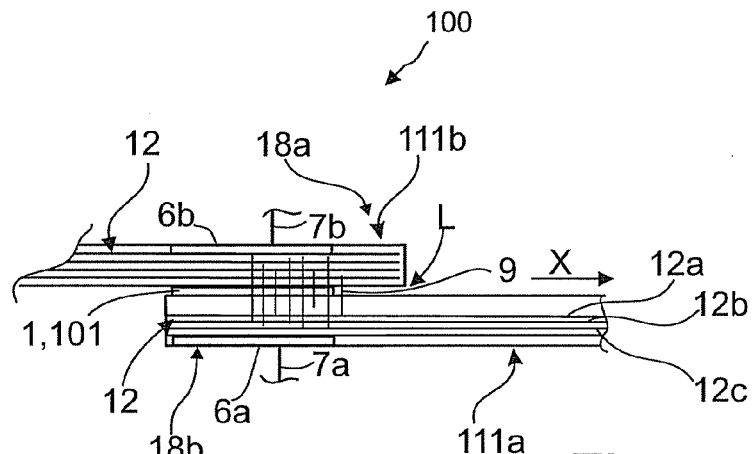
FIGS. 5a to 5d show different types of connections between two intermediate products.

Product parts 111a, 111b form a structural fiber composite product by a connection between two intermediate products 11a, 11b and a connection section 101 is illustrated in FIG. 5a, as being produced by means of the adhesive layer 1 with connecting particles 9, thus being product parts 111a, 111b of an structural fiber composite product. The adhesive layer 1 was situated on a flat surface of the respective connecting area 18a, 18b and form a connection section 101.

Figure 5B:
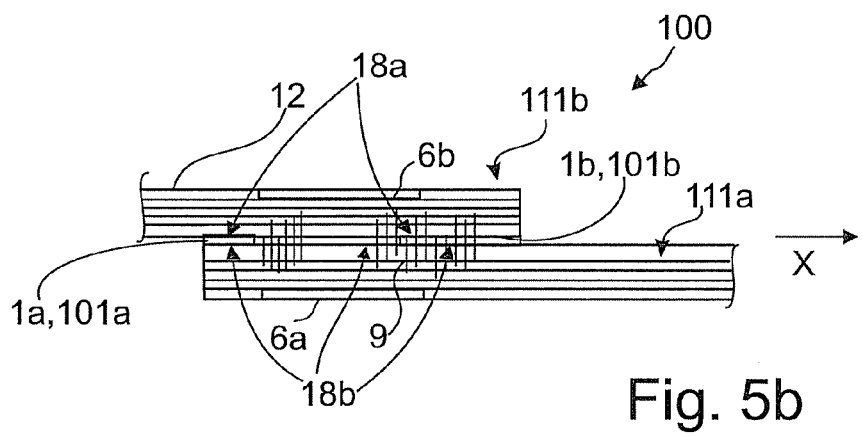

FIG. 5b, in contrast, shows a connection produced with two adhesive layers 1a, 1b that lie adjacent to one another referred to the planar extent of the product parts 111a, 111b or a longitudinal direction x such that both adhesive layers 1a, 1b or connecting sections 101a, 101b generate adhesive forces on their sides that are in contact with the connecting areas 18a, 18b. This may be realized, in particular, in the inventive bonded connections between a fuselage shell and a reinforcing brace, i.e., a frame or stringer, at the respective connecting areas 18a, 18b. However, it is also possible to utilize the entire contact region between two connecting areas 18a, 18b of intermediate products for adhesive purposes.

Figure 5C:
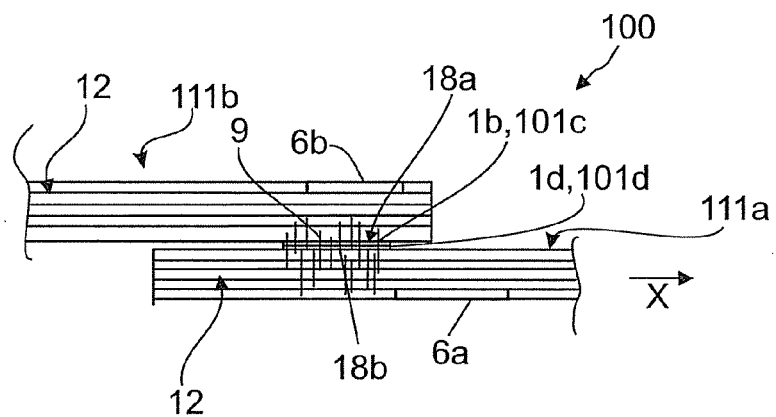

FIG. 5c shows an arrangement similar to FIG. 5b, but can be distinguished in that two adhesive layers 1a, 1b or connecting sections 101c, 101d are situated on top of one another between two overlapping intermediate products.

In the connections between connecting areas illustrated in FIGS. 5a to 5d, the connecting particles 9 are in direct contact with the reinforcing fibers 12 which preferably are made of carbon fibers. FIGS. 5a to 5d show connecting particles 9 that protrude relatively far into the respective connecting areas 18a, 18b such that they are not only in contact with reinforcing fibers of the upper layer of reinforcing fibers referred to the respective surface of the connecting area 18a, 18b of an intermediate product which faces the respective other intermediate product, but also with reinforcing fibers of lower layers. In the application of the inventive method, however, it suffices if the connecting particles 9 are only in contact with reinforcing fibers of the upper layer, namely with respect to an improvement of the strength of the connection between connecting areas, as well as with respect to the ability to check the integrity of this connection by means of electrical measuring methods. When the matrix material of the intermediate products 11a, 11b is made of a thermosetting material, the connecting particles 9 provide further load-bearing connections between the product parts 111a, 111b, as the connecting particles 9 are connected to load-bearing fibers of layers of load-bearing fibers of the product parts 111a, 111b by the binding forces between the connecting particles 9 and the load-bearing fibers of the product parts 111a, 111b. Such a contact is either realized by depositing the connecting particles 9 on the surface of the intermediate products 11a, 11b when the matrix material is in a viscous or semi-fluid state or, when the matrix material is in a cured or semi-cured state, after sectionally pre-processing the surface of an intermediate product e.g. with a laser such that matrix material is removed from the composite fiber material in such a way that at least the upper layer of reinforcing fibers is exposed so that the deposited connecting particles 9 come in contact with the load-bearing fibers of the intermediate products 11a, 11b.

Figure 5D:
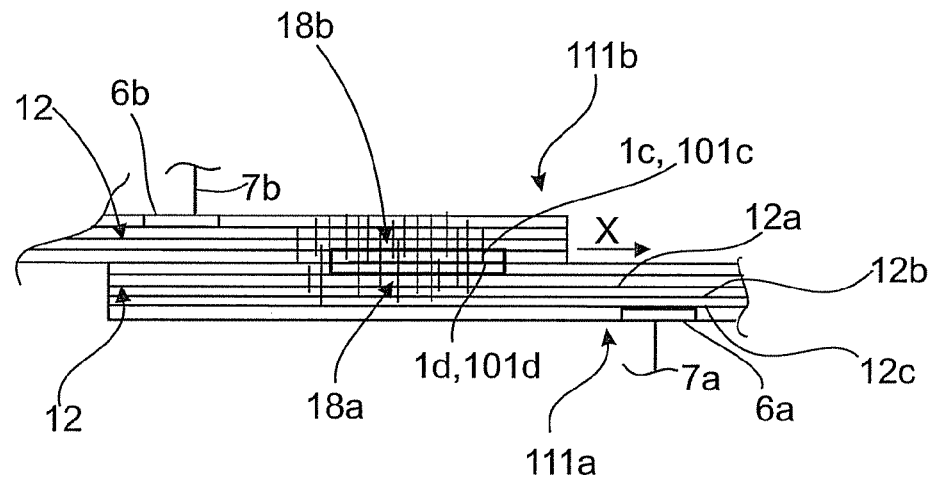

FIG. 5d shows a configuration of product parts 11a, 11b similar as shown in FIG. 5c, however, the connection sections 101c, 101d made of the layer 1c, 1d are situated in recesses 15a, 15b which were produced by removal of matrix material as for example shown in FIG. 1.

FIGS. 5a to 5d schematically show that electric connecting devices 6a, 6b for connecting electrically conductive measuring lines 7a, 7b to a contacting device for realizing the electric contacting thereof are connected to surfaces of the respective connecting areas 18a, 18b of each intermediate product 11a, 11b that in their cured state face away from the surfaces of the respective connecting areas 18a, 18b that contact the adhesive layer 1, wherein the connecting devices 6a, 6b are respectively realized such that they each feature an electrically conductive connecting element that is an electric contact with at least one reinforcing fiber on the one hand and electrically connected to the respective contacting device on the other hand. If the layers 12a, 12b, 12c of reinforcing fibers are conventionally arranged in the intermediate products 11a, 11b such that reinforcing fibers of different layers 12a, 12b, 12c contact one another, it suffices to arrange the electrically conductive connecting elements of the connecting devices 6a, 6b on the surfaces of the intermediate products 11a, 11b that lie opposite of one another.

Figure 6:
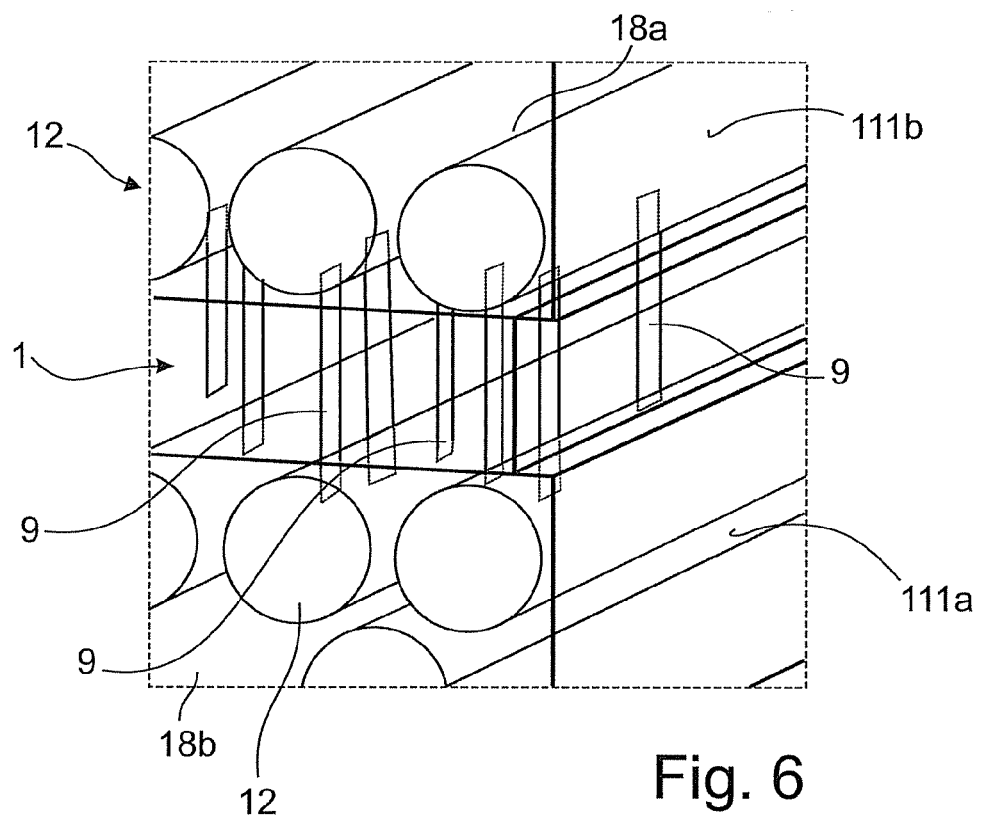
FIG. 6 shows a detailed perspective view of a region of two connecting sections of different intermediate products, in which the reinforcing fibers thereof are illustrated together with connecting particles that are respectively in contact with these reinforcing fibers.

FIG. 6 shows the result of a preferred inventive connection between two intermediate products 11a, 11b that is produced by means of an adhesive layer 1, in which connecting particles 9 for connecting the fibers of both intermediate products 11 to one another are arranged in accordance with the invention. In this position of the connecting particles 9, a direct connection between the fibers of a layer 12 of fibers of the intermediate products 11a, b is produced. Consequently, one end section of the connecting particle 9 interacts with a fiber 12 of the first intermediate product 11a and the other end section interacts with a fiber 12 of the second intermediate product 11b. This simplifies the flow of forces from the fibers of the intermediate products 11 to the connecting particles 9 and vice versa. Consequently, an extremely stable connection is produced, the adhesion of which can be simply checked by means of the measuring method described with reference to FIG. 7.

The adhesive film preferably has a thickness of 0.1 to 0.7 mm, particularly 0.3 mm. The thickness can generally be between 0.1 and 2 mm.

Figure 7:
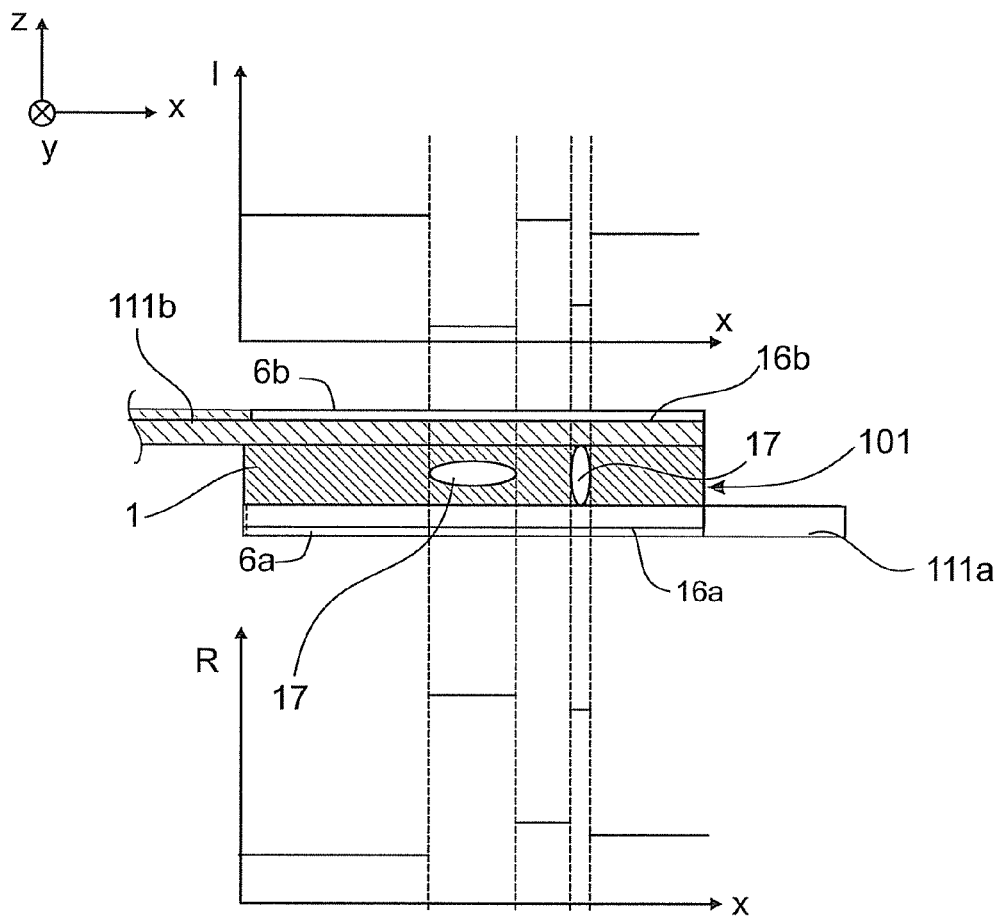
FIG. 7 shows diagrams of a measurement of the integrity of the connection between two connecting sections.

FIG. 7 schematically shows a measurement process for a component assembly or for a product realized in accordance with the above-described method. The measurement process makes it possible to check the integrity of the connecting point between two intermediate products. Prior to such a measurement, however, electric connecting devices 6a, 6b for connecting electrically conductive measuring lines 7a, 7b to a contacting device for realizing the electric contacting thereof need to be connected to surfaces of the respective connecting area 18a, 18b of each intermediate product 11a, 11b that in their cured state face away from the surfaces of the respective connecting areas 18a, 18b that contact the adhesive layer 1, wherein the connecting devices 6a, 6b are respectively realized such that they each feature an electrically conductive connecting element that is an electric contact with at least one reinforcing fiber on the one hand and electrically connected to the respective contacting device on the other hand. The connecting particles, as well as the reinforcing fibers of the intermediate products 11a, 11b, are realized in an electrically conductive fashion in this case.

In order to ensure that the connection can be adequately measured, (not-shown) electric connecting devices are arranged on the surfaces of the respective connecting area 18a, b of each intermediate product 11a, b that in their cured state face away from the surfaces of the respective connecting areas that contact the adhesive layer 1. These electric connecting devices serve for connecting electrically conductive measuring lines to a contacting device for realizing the electric contacting thereof. The connecting devices are respectively realized such that they each feature an electrically conductive connecting element that is in contact with at least one reinforcing fiber on the one hand and electrically connected to the respective contacting device on the other hand.

As shown in FIG. 5d, the connecting devices 6a, 6b can be positioned in a distance from each other with regard to the x-direction or a direction in which the overlapping area of the products 111a, 111b extend. In this embodiment, the integrity of the connection between the products 111a, 111b can be checked over the distance in which the connecting devices 6a, 6b are spaced apart.

Furthermore, FIG. 7 respectively shows the connecting region 8 or the connection between two intermediate products 11a, 11b. In this case, the adhesive layer 1 with the carbon connecting particles 9 is defective. Such defects are schematically indicated in FIG. 7 and identified by the reference symbol 17. In order to test such a connection, connecting devices 6a, 6b with respective electrodes are arranged on the respective surface 16a, 16b of an intermediate product 11a, 11b in the above-described fashion. A (not-shown) conductive metallic layer may be arranged at the measuring points in order to ensure sufficient contact between the surface 16a, 16b of an intermediate product and a connecting device 6a, 6b or an electrode, respectively. These electrodes are electrically contacted by means of a contacting device such that an anode and a cathode are realized, to which a (not-shown) voltage source is connected. A current I can flow between the electrodes due to the conductivity of the connecting devices, the connecting particles 9 and the reinforcing fibers. Likewise, the resistance R can also be measured. In this case, the diagrams respectively show the current flow I along the measuring range (along the coordinate x) and the resistance R above and below the measuring range. In the region of defects 17, the current flow I assumes a lower value while the resistance increases at these locations. This situation is reversed in regions, in which no defects 17 exist. In this case, the current flow I in the measuring circuit is high and the resistance R is low. The connecting devices may be realized in such a way that they extend over a section of or over the entire region, in which the adhesive layer and the respective surface of the intermediate product flatly adjoin one another in the planar extent of the connecting area of the respective intermediate product. A measuring signal evaluation device is connected to the measuring lines 7a, 7b and determines the current and/or voltage values for the respective section, to which the connecting devices 6a, 6b are connected on the respective surfaces of the intermediate products.

FIG. 8 shows an embodiment of a component assembly 19 with two fiber-reinforced product parts 111a, 111b that are connected to one another via a connecting section 101, namely intermediate products in the form of a stringer 20 and a fuselage cell skin 21. Both intermediate products feature several layers of fibers that are embedded in a matrix. An adhesive layer 1 featuring a cured adhesive film F and a plurality of carbon connecting particles 9 distributed therein is arranged in the connecting region 22. The connecting particles 9 contact the reinforcing fibers of the stringer 20, as well as the reinforcing fibers of the fuselage cell skin 21, and respectively protrude into the respective material of the stringer 20 and the fuselage cell skin 21. Furthermore, the principal longitudinal directions of at least a portion of the connecting particles 9 are aligned within an angular range of 0 to +/−45 degrees referred to the normal vector NV of the surface plane of the stringer 20. Although the figure only shows the x-z plane, the orientations of the principal longitudinal directions of the connecting particles 9 may also lie within the aforementioned angular range in the y-z plane. However, depend on the method use for producing the structural fiber composite product 100, the connecting particles 9 can be arranged in an irregular manner and not aligned in the angular range of 0 to +/−45 degrees referred to the normal vector NV. An electric connecting device 6b, e.g., with the function of a cathode is respectively arranged above or on the fuselage cell skin 21. Another electric connecting device 6a, e.g., with the function of an anode 7 is arranged opposite thereof on the stringer 20. Both layers serve for easily contacting a voltage source and a measuring device, by means of which the respective connecting region 8 or 18a, 18b can be checked for defects—as described above with reference to FIG. 7.

FIG. 9 shows a method for producing an adhesive layer 1 for connecting intermediate products or components that respectively consist of composite fiber material with a layer of matrix material and reinforcing fibers extending therein. In this respect, FIG. 9 shows how a plurality of connecting particles 9 is arranged on a substrate 10. This figure furthermore shows how an adhesive film 2 that is supplied in the direction of the substrate 10 is with the connecting particles 9. On the substrate 10, the connecting particles 9 are pressed into the adhesive film 2 in such a way that the connecting particles 9 respectively penetrate the adhesive film 2 and protrude from the adhesive film 2 with two end sections 9a, 9b that lie opposite of one another referred to the principal longitudinal direction of the connecting particles 9. Generally, the insertion of the connecting particles 9 into the adhesive film 2 is realized by respectively pressing the adhesive film 2 onto the substrate or the connecting particles 9. The corresponding pressure is exerted upon the adhesive film 2 by means of a roller 3. This is realized by rolling the roller 3 on the surface of the adhesive film 2 in the direction of a planar extent of the adhesive film. The roller is situated on the surface of the adhesive film 2 that faces away from the side of the adhesive film 2 facing the substrate 10. The adhesive film 2 consists of plastically deformable material and can be cured under the influence of heat. According to an alternative embodiment of the inventive method, it is proposed that the connecting particles 9 on the substrate 10 are pressed into the adhesive film 2 in such a way that the connecting particles 9 respectively penetrate the adhesive film 2 on only one of its sides and protrude from the adhesive film 2 with only one of the two end sections 9a, 9b that lie opposite of one another referred to the principal longitudinal direction of the connecting particles 9. Adhesive layers of this type are illustrated in FIG. 5c (reference symbols 1a, 1b).

FIG. 10 shows the production device 14 according to FIG. 9 during a procedural step in the production of an adhesive layer 1 that takes place prior to pressing the adhesive layer 2 onto a substrate layer 10. In this case, a semifinished product in the form of a substrate 10 with a plurality of connecting particles 9 that protrude from the substrate layer 10 is accommodated by a receptacle device 22. In addition, a rolling device 23 with a tool frame 24 and a roller 3 rotatably supported thereon is illustrated in this figure. Furthermore, FIG. 10 shows part of a holding device 25 for holding a strip-shaped adhesive film 2 that is coiled up in this embodiment. In this case, the adhesive film 2 is guided to the rolling device 23 by the holding device 25 or vice versa and held between the semifinished product 10 situated on the receptacle device 22 and the roller 3 (in a not-shown fashion). A guiding device G with a motion kinematics move the tool frame 24 along the receptacle device 22 in such a way that the roller 3 is rolled on the substrate 10 and simultaneously exerts a predetermined pressure. The possible moving directions of the rolling device 23 are indicated with double arrows. In this way, as many connecting particles 9 as possible are separated from the substrate 10 with maximum length and simultaneously pressed into the adhesive film 2.

In order to prevent the connecting particles 9 from buckling and, in particular, from assuming a different orientation on the substrate 10 or on the roller 3 during the rolling motion of the roller 3, the roller 3 is spring-loaded (in a not-shown fashion) and/or the rolling device 23 may be equipped with a display for the contact pressure. In a fully automated process, the rolling device 23 features a corresponding pressure sensor. It is therefore ensured that a plurality of connecting particles 9 has a spatial orientation that allows an electrical measurement of the integrity of a connection produced in accordance with the invention. In any case, a spring-loaded rolling device 23 makes it possible to achieve a reproducible quality of the adhesive layer.

The free end of the adhesive film 2 provided with connecting particles 9 may be coiled up anew on another holding device or immediately cut to length and applied, in particular, onto an intermediate product in accordance with an inventive method.

The invention claimed is:

1. A method for connecting two intermediate products that respectively comprise composite fiber material with a layer of matrix material and reinforcing fibers extending therein, wherein the matrix material is respectively in a cured and/or plastic state, wherein the first intermediate product comprises a first connecting area and the second intermediate product comprises a second connecting area that adjoin one another in an overlapping region of the interconnected intermediate products, with the method comprising:

applying an adhesive layer that comprises an adhesive film of a material that can be plastically deformed in a first state and cured in a second state, as well as a plurality of elongate connecting particles that are accommodated by the adhesive film, onto the first connecting area of the first intermediate product or the second connecting area of the second intermediate product such that at least a portion of the plurality of connecting particles comes in contact with reinforcing fibers of the first connecting area or the second connecting area, wherein the adhesive film is in the first, plastically deformable state during the application of the adhesive layer, arranging the second intermediate product on the first intermediate product or vice versa such that the connecting area of the second intermediate product at least partially overlaps the connecting area of the first intermediate product, connecting the two intermediate products by exerting pressure upon the adhesive layer and/or by generating heat in the adhesive layer, and wherein the respective matrix material of at least the connecting area of one of the intermediate products is initially in a cured state and reinforcing fibers are sectionally exposed in order to make available a respective connecting area such that at least a portion of the plurality of connecting particles comes in contact with reinforcing fibers of the first connecting area or the second connecting area when the adhesive layer with the adhesive film and the plurality of elongate connecting particles contained in the adhesive film is applied.

2. The method according to claim 1, wherein at least a portion of the connecting particles has a tubular shape or pin shape that extends in a principal longitudinal direction, wherein the maximum diameter of cross-sectional areas, to which the principal longitudinal direction respectively extends perpendicular, amounts to up to 1000 nm and the length of the connecting particles amounts to 0.5 mm to 5 mm.

3. The method according to claim 1, wherein an adhesive layer with a thickness direction extending transverse to the planar extent thereof is applied, in which at least a portion of the connecting particles is situated within the adhesive film and/or in which at least a portion of the connecting particles penetrates the adhesive film in such a way that these connecting particles extend along the thickness direction of the adhesive layer and at least one of two end sections that lie opposite of one another referred to the principal longitudinal direction of the connecting particles protrudes from one of the oppositely arranged surfaces of the adhesive film.

4. The method according to claim 1, wherein matrix material is removed in the respective connecting area until reinforcing fibers are sectionally exposed in order to realize the sectional exposure of reinforcing fibers in a surface area of the first and/or second connecting area of the respective intermediate product, wherein the removal of matrix material is realized by exposing the surface of the first and/or second connecting area of the respective intermediate product to the radiation of a laser.

5. The method according to claim 1, wherein the respective matrix material of at least the connecting area of one of the intermediate products is initially in a plastic or free-flowing state such that at least a portion of the plurality of connecting particles comes in contact with reinforcing fibers of the first connecting area or the second connecting area when the adhesive layer with the adhesive film and the plurality of elongate connecting particles contained in the adhesive film is applied.

6. The method according to claim 5, wherein the intermediate product, the matrix material of which is in a plastic state, comprises a ductile prepreg material.

7. The method according to claim 1, wherein the following step precedes the application of the adhesive layer onto the respective connecting area of the first and/or the second intermediate product: removing connecting particles from a substrate layer, on which a plurality of connecting particles is made available, by the adhesive film in a plastic state and absorbing connecting particles by sectionally pressing the adhesive film onto the substrate layer featuring the connecting particles.

8. The method according to claim 1, wherein the connecting particles and the reinforcing fibers consist of an electrically conductive material, and in that electric connecting devices for connecting electrically conductive measuring lines to a contacting device for realizing the electric contacting thereof are connected to surfaces of the respective connecting area of each of the intermediate products that in their cured state face away from the surfaces of the respective connecting area that adjoin the adhesive layer, wherein the connecting devices are respectively realized such that each connecting device comprises an electrically conductive connecting element that is in electric contact with at least one reinforcing fiber on the one hand and electrically connected to the respective contacting device on the other hand.

\* \* \* \* \*